United States Patent
Crabtree et al.

(10) Patent No.: US 11,087,403 B2
(45) Date of Patent: Aug. 10, 2021

(54) RISK QUANTIFICATION FOR INSURANCE PROCESS MANAGEMENT EMPLOYING AN ADVANCED DECISION PLATFORM

(71) Applicant: QOMPLX, Inc., Tyons, VA (US)

(72) Inventors: Jason Crabtree, Vienna, VA (US); Andrew Sellers, Monument, CO (US)

(73) Assignee: QOMPLX, INC., Tysons, VA (US)

( * ) Notice: Subject to any disclaimer, the term of this patent is extended or adjusted under 35 U.S.C. 154(b) by 670 days.

(21) Appl. No.: 15/343,209

(22) Filed: Nov. 4, 2016

(65) Prior Publication Data

US 2017/0124662 A1 May 4, 2017

Related U.S. Application Data

(63) Continuation of application No. 15/229,476, filed on Aug. 5, 2016, now Pat. No. 10,454,791, and a continuation-in-part of application No. 15/237,625, filed on Aug. 15, 2016, now Pat. No. 10,248,910, each of which is a continuation-in-part of application No. 15/206,195, filed on Jul. 8, 2016, which is a (Continued)

(51) Int. Cl.
*G06Q 40/08* (2012.01)
*G06Q 30/02* (2012.01)

(52) U.S. Cl.
CPC ......... *G06Q 40/08* (2013.01); *G06Q 30/0202* (2013.01)

(58) Field of Classification Search
None
See application file for complete search history.

(56) References Cited

U.S. PATENT DOCUMENTS 7,171,515 B2 * 1/2007 Ohta .................. G06F 12/0862
                                                        711/113
8,145,507 B2 * 3/2012 Zizzamia ............... G06Q 40/02
                                                        705/4

(Continued)

FOREIGN PATENT DOCUMENTS

WO        0163534 A2    8/2001
WO     2015094545 A1    6/2015

OTHER PUBLICATIONS

Ho, Chia-Ling; Lai, Gene C; Lee, Jin-Ping. "Organizational structure, board composition, and risk taking in the US property casualty insurance industry". The Journal of Risk and Insurance; Malvern vol. 80, No. 1 (Mar. 2013): pp. 169-203. (Year: 2013).*

*Primary Examiner* — Christopher Bridges
*Assistant Examiner* — Tony P Kanaan
(74) *Attorney, Agent, or Firm* — Brian R. Galvin; Galvin Patent Law LLC

(57) ABSTRACT

A system for insurance process management employing an advanced decision platform has been developed. A high speed data retrieval and storage module retrieves insurance related data from a plurality of sources. A predictive analytics module performs predictive analytics functions on normalized insurance related data. A predictive simulation module performs predictive simulation functions on normalized insurance related data. An interactive display module displays results of activity of the predictive analytics module and the predictive simulation module as pre-programmed by analysts of an investigation, and re-display results in ways differing by additional representation programming instructions over the course of a viewing session.

12 Claims, 8 Drawing Sheets

Related U.S. Application Data continuation-in-part of application No. 15/186,453, filed on Jun. 18, 2016, which is a continuation-in-part of application No. 15/166,158, filed on May 26, 2016, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned.

(56) References Cited

U.S. PATENT DOCUMENTS

| | | | | |
|---|---|---|---|---|
| 8,762,179 | B2* | 6/2014 | Stephens | G06Q 40/08 705/4 |
| 8,775,220 | B2* | 7/2014 | Maher | G06Q 40/08 705/4 |
| 9,892,463 | B1* | 2/2018 | Hakimi-Boushehri | G06Q 40/08 |
| 10,204,147 | B2* | 2/2019 | Crabtree | H04L 67/12 |
| 10,210,255 | B2* | 2/2019 | Crabtree | G06F 16/9566 |
| 10,304,137 | B1* | 5/2019 | Genser | G06Q 40/08 |
| 10,454,791 | B2* | 10/2019 | Crabtree | G06Q 10/06 |
| 10,860,962 | B2* | 12/2020 | Crabtree | G06Q 10/0637 |
| 10,917,428 | B2* | 2/2021 | Crabtree | G06F 16/24578 |
| 10,938,683 | B2* | 3/2021 | Crabtree | H04L 43/04 |
| 11,025,674 | B2* | 6/2021 | Crabtree | H04L 63/20 |
| 2003/0149657 | A1* | 8/2003 | Reynolds | G06Q 40/08 705/38 |
| 2005/0000165 | A1* | 1/2005 | Dischinat | E06B 7/23 49/496.1 |
| 2005/0055249 | A1* | 3/2005 | Helitzer | G06Q 40/08 705/4 |
| 2005/0144114 | A1* | 6/2005 | Ruggieri | G06Q 40/08 705/37 |
| 2006/0136273 | A1* | 6/2006 | Zizzamia | G06Q 40/08 705/4 |
| 2006/0190378 | A1* | 8/2006 | Szydlo | G06Q 40/06 705/35 |
| 2007/0016542 | A1* | 1/2007 | Rosauer | G06N 5/022 706/21 |
| 2007/0150319 | A1* | 6/2007 | Menendez | G06Q 40/00 705/4 |
| 2007/0168370 | A1* | 7/2007 | Hardy | G06F 16/29 |
| 2008/0103841 | A1* | 5/2008 | Lewis | G06Q 10/0635 705/4 |
| 2009/0259581 | A1* | 10/2009 | Horowitz | G06Q 40/08 705/35 |
| 2010/0063851 | A1* | 3/2010 | Andrist | G06Q 40/08 705/4 |
| 2010/0169237 | A1* | 7/2010 | Howard | G06Q 40/06 705/36 R |
| 2011/0153368 | A1* | 6/2011 | Pierre | G06Q 10/067 705/4 |
| 2011/0161116 | A1* | 6/2011 | Peak | G01C 21/36 705/4 |
| 2011/0161119 | A1* | 6/2011 | Collins | G06Q 40/08 705/4 |
| 2011/0213628 | A1* | 9/2011 | Peak | G06Q 40/08 705/4 |
| 2012/0143633 | A1* | 6/2012 | Salghetti | G06Q 40/08 705/4 |
| 2012/0150570 | A1* | 6/2012 | Samad-Khan | G06Q 40/08 705/4 |
| 2014/0081876 | A1* | 3/2014 | Schulz | G06Q 10/20 705/305 |
| 2014/0129261 | A1* | 5/2014 | Bothwell | G06N 20/00 705/4 |
| 2014/0149144 | A1* | 5/2014 | Li | G06Q 10/10 705/4 |
| 2014/0358582 | A1* | 12/2014 | Kemp | G06Q 40/08 705/3 |
| 2014/0359552 | A1* | 12/2014 | Misra | G06F 8/60 717/100 |
| 2015/0025917 | A1* | 1/2015 | Stempora | G06K 9/0061 705/4 |
| 2015/0073834 | A1* | 3/2015 | Gurenko | G06Q 10/10 705/4 |
| 2015/0161738 | A1* | 6/2015 | Stempora | G06Q 40/08 705/4 |
| 2016/0006629 | A1* | 1/2016 | Ianakiev | G06F 21/32 709/224 |
| 2016/0125546 | A1* | 5/2016 | Bostic | G06Q 40/08 705/4 |
| 2017/0098278 | A1* | 4/2017 | Carges | G06Q 40/08 |
| 2017/0124662 | A1* | 5/2017 | Crabtree | G06Q 30/0202 |
| 2017/0161859 | A1* | 6/2017 | Baumgartner | G06Q 30/0205 |
| 2019/0283745 | A1* | 9/2019 | Nagel | B60W 30/0956 |
| 2021/0073915 | A1* | 3/2021 | Crabtree | G06Q 30/0202 |

* cited by examiner

RISK QUANTIFICATION FOR INSURANCE PROCESS MANAGEMENT EMPLOYING AN ADVANCED DECISION PLATFORM

CROSS-REFERENCE TO RELATED APPLICATIONS

This application is a continuation-in-part of U.S. patent application Ser. No. 15/237,625, titled "DETECTION MITIGATION AND REMEDIATION OF CYBERATTACKS EMPLOYING AN ADVANCED CYBER-DECISION PLATFORM", and filed on Aug. 15, 2016, and is also a continuation in part of U.S. patent application Ser. No. 15/229,476, titled "HIGHLY SCALABLE DISTRIBUTED CONNECTION INTERFACE FOR DATA CAPTURE FROM MULTIPLE NETWORK SERVICE SOURCES", and filed on Aug. 5, 2016, which is a continuation-in-part of U.S. patent application Ser. No. 15/206,195, titled "ACCURATE AND DETAILED MODELING OF SYSTEMS WITH LARGE COMPLEX DATASETS USING A DISTRIBUTED SIMULATION ENGINE", and filed on Jul. 8, 2016, which is continuation-in-part of U.S. patent application Ser. No. 15/186,453, titled "SYSTEM FOR AUTOMATED CAPTURE AND ANALYSIS OF BUSINESS INFORMATION FOR RELIABLE BUSINESS VENTURE OUTCOME PREDICTION" and filed on Jun. 18, 2016, which is a continuation-in-part of U.S. patent application Ser. No. 15/166,158, titled "SYSTEM FOR AUTOMATED CAPTURE AND ANALYSIS OF BUSINESS INFORMATION FOR SECURITY AND CLIENT-FACING INFRASTRUCTURE RELIABILITY", and filed on May 26, 2016, which is a continuation-in-part of U.S. patent application Ser. No. 15/141,752, titled "SYSTEM FOR FULLY INTEGRATED CAPTURE, AND ANALYSIS OF BUSINESS INFORMATION RESULTING IN PREDICTIVE DECISION MAKING AND SIMULATION, and filed on Apr. 28, 2016, which is a continuation-in-part of U.S. patent application Ser. No. 14/925,974, titled "RAPID PREDICTIVE ANALYSIS OF VERY LARGE DATA SETS USING THE DISTRIBUTED COMPUTATIONAL GRAPH" and filed on Oct. 28, 2015, and is also a continuation-in-part of U.S. patent application Ser. No. 14/986,536, titled "DISTRIBUTED SYSTEM FOR LARGE VOLUME DEEP WEB DATA EXTRACTION", and filed on Dec. 31, 2015, and is also a continuation-in-part of U.S. patent application Ser. No. 15/091,563, titled "SYSTEM FOR CAPTURE, ANALYSIS AND STORAGE OF TIME SERIES DATA FROM SENSORS WITH HETEROGENEOUS REPORT INTERVAL PROFILES", and filed on Apr. 5, 2016, the entire specification of each of which is incorporated herein by reference in its entirety.

BACKGROUND OF THE INVENTION

Field of the Invention

The present invention is in the field of use of computer systems in business information management, operations and predictive planning. Specifically, the use of an advanced decision system to provide ongoing risk and peril quantification for insurance business operations.

Discussion of the State of the Art

Insurance as a business field would certainly be characterized as highly reliant on the acquisition and analysis of information. Each client, possibly each policy, relies on the capture, cleaning, normalization and analysis of data pertaining to the client's specific assets, to the plurality of risk factors present at the site or sites where those assets reside, the various perils encountered during occupation of client infrastructure and the operation of client equipment, possible geo-political factors need to be accounted for. These few examples added to others known to those skilled in the art results in a nearly overwhelming influx of information to process and extract, information necessary to intelligently write insurance policies and set premium pricing. The insurance industry is most certainly one where the participants that can gather and intelligently process information to the point where reliable predictions can be made are those that fend best and survive.

There have been several recent developments in business software that have arisen with the purpose of streamlining or automating either business data analysis or business decision process which might be harnessed to aid in insurance business operations of policy writing, capital reserve calculation and premium pricing. PLANATIR™ offers software to isolate patterns in large volumes of data, DATABRICKS™ offers custom analytics services, ANAPLAN™ offers financial impact calculation services. There are other software sources that mitigate some aspect of business data relevancy identification in isolation, but these fail to holistically address the entire scope of insurance data analysis. Analysis of that data and business decision automation, however, remains out their reach. Currently, none of these solutions handle more than a single aspect of the whole task, cannot form predictive analytic data transformations and, therefore, are of little use in the area of insurance practices, where the only solution is a very complex process requiring sophisticated integration of the tools above.

While the ability to retrieve large amounts of data has greatly increased and there are packages that purport to aid actuaries and underwriters assess risk they only serve to add to the overload of information described above, and, to be of optimal use, must be carefully analyzed by any business information management system purporting to provide reliable insurance relevant prediction capability and quantifiable decision support.

What is needed is a fully integrated system that retrieves risk, insurance market and capital relevant information from many heterogeneous sources using a scalable, expressively scriptable, connection interface, identifies and analyzes that high volume data, transforming it into a useful format after automatically finding hidden patterns in the data. Such a system must then use that data to drive an integrated, highly scalable simulation engine which may employ combinations of the system dynamics, discrete event and agent based paradigms within a simulation run such that the most useful and accurate data transformations are obtained and stored for the human analysts such as actuaries, underwriters and financial officers to rapidly digest the presented information, readily comprehend any predictions or recommendations and then creatively respond to optimize client insurance coverage and insurer business interests including profit. This multimethod information insurance risk and coverage information capture, analysis, transformation, outcome prediction, and presentation system forming a "business operating system."

SUMMARY OF THE INVENTION

Accordingly, the inventor has developed a system for risk quantification for insurance process management employing an advanced cyber-decision platform. In a typical embodiment, the advanced cyber decision platform, a specifically programmed usage of the business operating system, continuously retrieves data related to asset worth, environmental conditions such as but not limited to weather, fire danger, flood danger, and regional seismic activity, infrastructure and equipment integrity through available remote sensors, geo-political developments where appropriate and other appropriate client specific data. Of note, this information can be well-structured, highly schematized for automated processing (e.g. relational data), have some structure to aid automated processing, or be purely qualitative (e.g. human readable natural language) without a loss of generality. The system then uses this information for two purposes: First, the advanced computational analytics and simulation capabilities of the system are used to provide immediate disclosure of a presence of immanent peril and recommendations are given on that should be made to harden the affected assets prior to or during the incident. Second, new data is added to any existing data to update risk models for further analytic and simulation transformation used to recommend insurance coverage requirements and actuarial/underwriting tables for each monitored client. Updated results may be displayed in a plurality of formats to best illustrate the point to be made and that display perspective changed as needed by those running the analyses. The ability of the business operating system to capture, clean, and normalize data then to perform advanced predictive analytic functions and predictive simulations, alerting decision makers of deviations found from established normal operations, possibly providing recommendations in addition to analyzing all relevant asset and risk data to possibly provide premium costing and capital reserve values for each client, on a semi-continuous basis, if desired, frees decision makers in the insurer's employ to creatively employ the processed, analyzed data to increase client security and safety and to predominantly manage by exception.

According to a preferred embodiment of the invention, a system for risk quantification for insurance process management employing an advanced cyber-decision platform has been devised and reduced to practice, the invention comprising: a high speed data retrieval and storage module stored in a memory of and operating on a processor of a computing device and configured to: retrieve a plurality of insurance related data from a plurality of sources. A predictive analytics module stored in a memory of and operating on a processor of a computing device and configured to: normalize the insurance related data for use in analytical algorithms, perform predictive analytics functions on normalized insurance related data. A predictive simulation module stored in a memory of and operating on a processor of a computing device and configured to: normalize the insurance related data for use in simulation algorithms, perform a plurality of predictive simulation functions on normalized insurance related data. An interactive display module stored in a memory of and operating on a processor of a computing device and configured to: display the results of activity of the predictive analytics module as pre-programmed by analysts of an investigation, display the results of activity of the predictive simulation module as pre-programmed by analysts of an investigation, re-display results in ways differing by additional representation programming instructions over the course of a viewing session.

According to another embodiment of the invention, a system for risk quantification for insurance process management employing an advanced automated decision platform has been devised and reduced to practice, wherein at least a portion of the insurance related data are client asset worth amounts. Wherein at least a portion of the insurance related data are risk assessments at least one site of client business operation. Wherein at least a portion of the insurance related data are expert opinion information. Wherein at least one of the predictive simulation algorithms performs historical simulations. Wherein at least one of the predictive simulation algorithms performs Monte Carlo simulations. Wherein at least one of the predictive analytics algorithms employs information theory statistical calculations. Wherein at least one of the risk assessment factors is environmental condition profile at one or more sites of client business operation. Wherein at least one of the risk assessment factors is geo-political conditions at one or more sites of client business operation. Wherein at least a portion of the simulation data is displayed using a hazard model.

According to a preferred embodiment of the invention, a method for risk quantification for insurance process management employing an advanced cyber-decision platform comprising the steps of: a) retrieving insurance related data from a plurality of sources using a high speed data retrieval and storage module stored in a memory of and operating on a processor of a computing device; b) normalizing the retrieved insurance related data using a predictive analytics module stored in a memory of and operating on a processor of a computing device; c) performing analytic functions on the retrieved insurance related data using the predictive analytics module; d) normalizing the retrieved insurance related data using a predictive simulation module stored in a memory of and operating on a processor of a computing device; e) performing simulation functions on the retrieved insurance related data using the predictive simulation module; f) displaying the results of predictive analytic and simulation transformations according to pre-programmed instructions.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
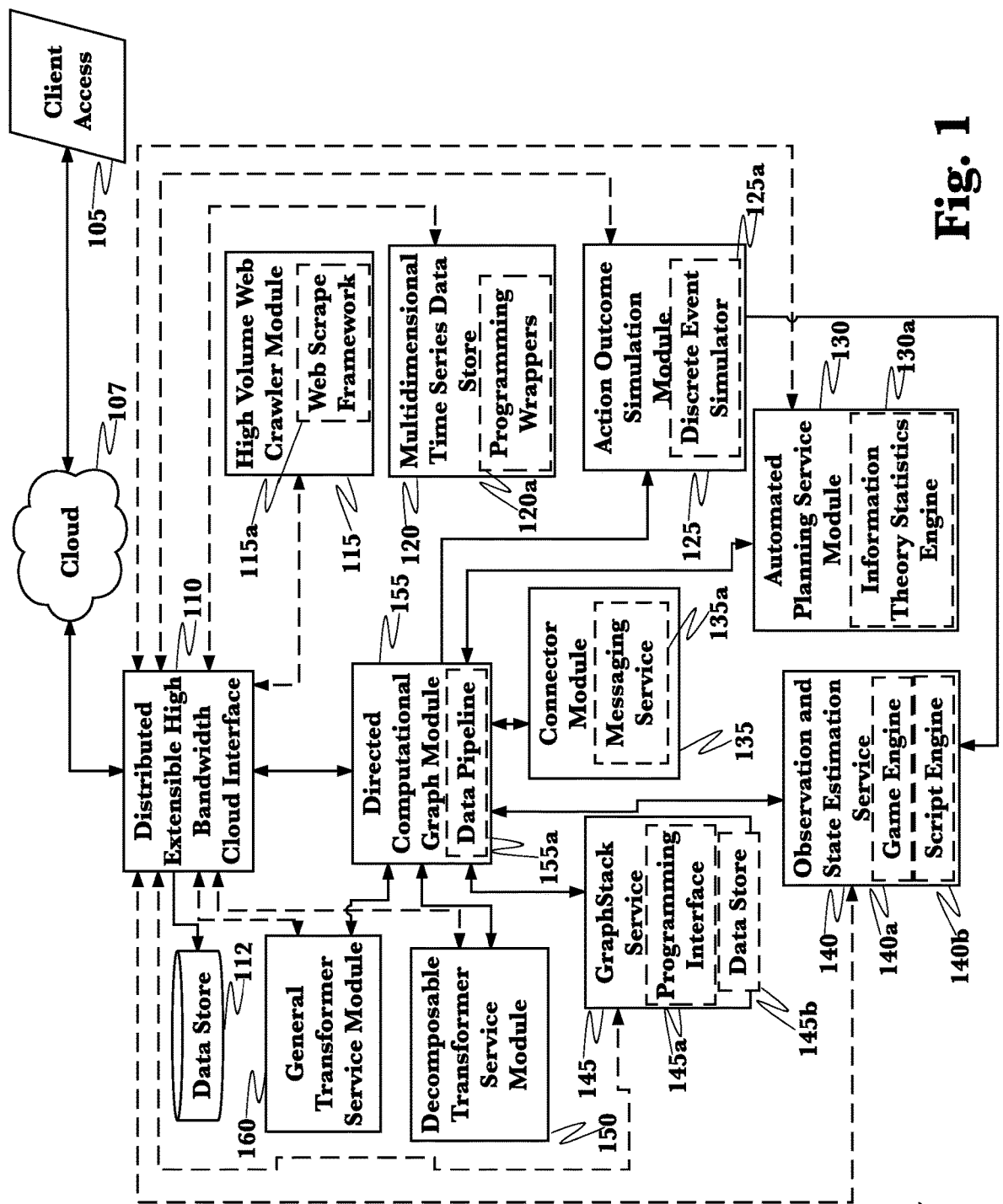
FIG. 1 is a diagram of an exemplary architecture of a business operating system according to an embodiment of the invention.

The inventor has conceived, and reduced to practice, a system for risk quantification for insurance process management employing an advanced decision platform.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices. For example, a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane may transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

Conceptual Architecture

FIG. 1 is a diagram of an exemplary architecture of a business operating system 100 according to an embodiment of the invention. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud based sources 107, public or proprietary such as, but not limited to: subscribed business field specific data services, external remote sensors, subscribed satellite image and data feeds and web sites of interest to business operations both general and field specific, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and the graph stack service 145. The directed computational graph module 155 retrieves one or more streams of data from a plurality of sources, which includes, but is not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to environmental factors at insured client infrastructure sites, component sensor readings and system logs of all insured client equipment, weather and catastrophic event reports for all regions an insured client occupies, political communiques from regions hosting insured client infrastructure and network service information captures such as, but not limited to news, capital funding opportunities and financial feeds, and sales, market condition and service related customer data. The module is designed to accommodate irregular and high volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph-based data store 145b such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125a coupled with the end user facing observation and state estimation service 140 which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data.

For example, the Underwriting Department is looking at pricing for a new perspective client who operates tugboats at three locations. The appraising team hired to estimate the company's assets has submitted a total equipment and infrastructure worth of $45,500,00.00. The system 100, from all available data estimates the total equipment and infrastructure worth to be approximately $49,000,000.00 due to significant dock footing improvements made at two of the sites. Analysis of data retrieved by the high volume web crawler module 115 shows that these two sites are in areas highly effected by both wind and storm surge caused by the passing of hurricanes and that two major claims including both infrastructure and vessel damage have been filed in the past 6 years. Graphical analysis 155, 145 of historical hurricane frequency and predictive analytics 130, 130a and simulation 125, 125a indicate that at least one hurricane event will occur in the next two years and analysis of provided published procedure as well as expenditures show 135 that nothing has been done to been done to further safeguard infrastructure or equipment at either site. Display of these data using a hazard model 140, 140a 140b predicts a major payout in the next two years leading to a significant net loss at prevailing premium pricing. From these results the insurer's actuaries and underwriters are efficiently alerted to these factors. It is decided to continue with the perspective venture but at a much higher premium rate and with higher capital reserves than originally expected.

Figure 2:
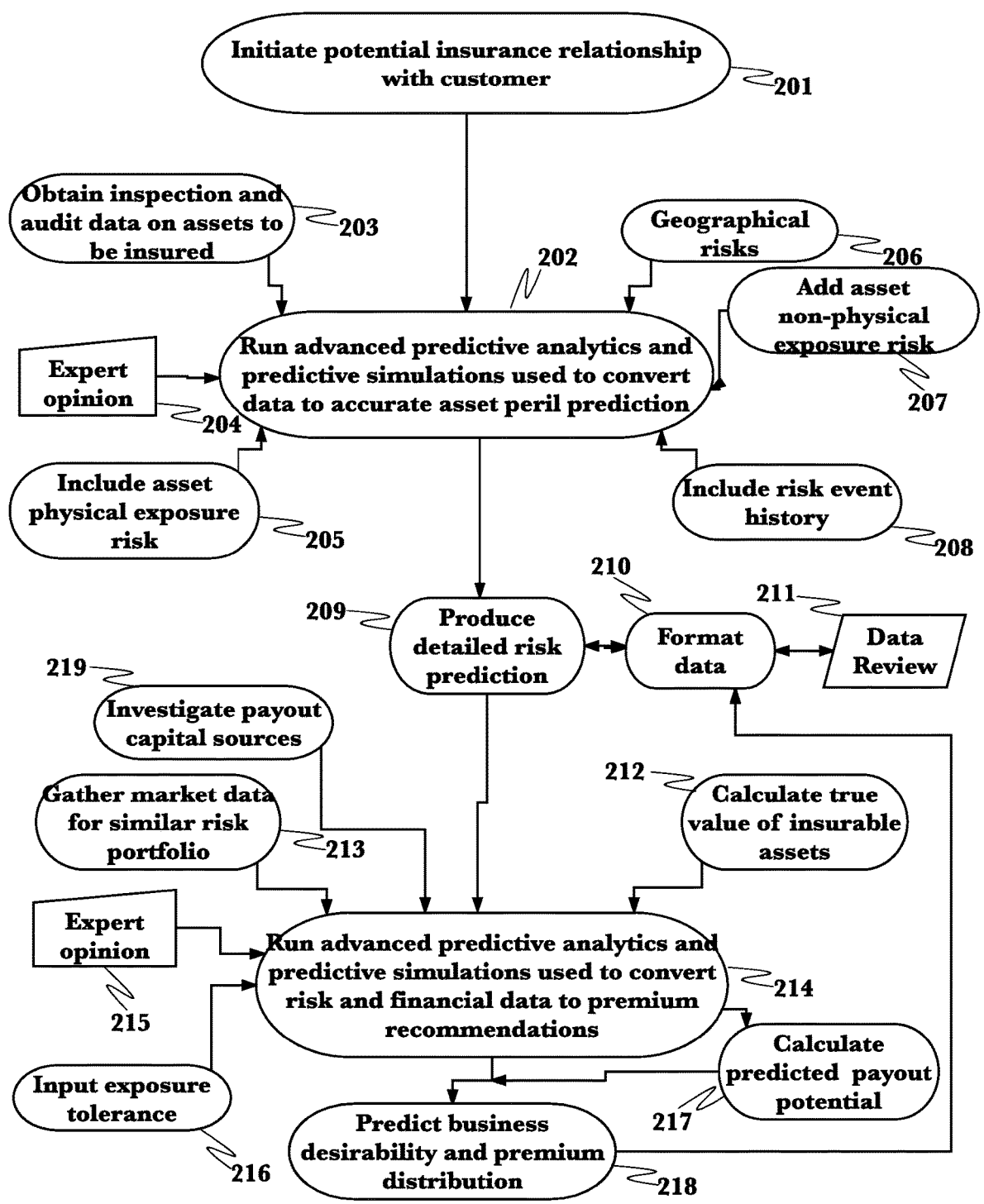
FIG. 2 is a flow diagram of an exemplary function of the business operating system in the calculation of asset hazard and risk in relationship to premium fixation.

FIG. 2 is a flow diagram of an exemplary function of the business operating system in the calculation of asset hazard and risk in relationship to premium fixation 200. In an embodiment, the prospect of a new insurance customer is presented 201. Several pieces of data combine to produce an insurance relationship that optimally serves both customer and insurer. All of this data must be cleanly analyzed not only individually but also as a whole, combined in multiple permutations and with the ability to uncover hard to foresee relationships and future possible pitfalls. The business operating system 100 previously disclosed in co-pending application Ser. No. 15/141,752 and applied in a role of cybersecurity in co-pending application Ser. No. 15/237,625, when programmed to operate as an insurance decision platform, is very well suited to perform advanced predictive analytics and predictive simulations 202 to produce risk predictions needed required by actuaries and underwriters to generate accurate tables for later pricing. Data forming the basis of these calculations may be drawn from a set comprising at least: inspection and audit data on the condition and worth of the customer's equipment and infrastructure to be insured 203; known and probable physical risks to customer's assets such as but not limited to: flooding, volcanic eruption, wildfires, tornado activity, hurricane or typhoon, earthquake among other similar dangers known to those skilled in the art 205; non-physical risks to customer's assets which may include, but are not limited to: electronic or cyberattack, and defective operating software as well as other similar risks known to those skilled in the field 207; and geographical risks, which may include but are not limited to: political and economic unrest, crime rates, government actions, and escalation of regional tensions 206. Also of great importance may be the actual history of risk events 208 occurring at or near the sites of a customer's assets as such data provides at least some insight into the occurrence and regularity of possible payout requiring events to be analyzed prior to policy generation. For the most complete and thereby accurate use of predictive analytics and predictive simulation 202, the possibility to add expert opinion and experience 204 to the body of data should be available. Important insights into aspects of a potential client may not be present or gleaned by the analysis of the other available data. An observation made by an insurer's expert 204 during the process, even if seemingly minor, may, when analyzed with other available data, give rise to additional queries that must be pursued or significantly change the predictive risk recommendations produced 209 by the insurance decision platform 202.

The generation of detailed risk prediction data 209, which may have granularity to every unit of equipment possessed and each structure as well as support land and services of each area of infrastructure as would be known to those skilled in the field, is of great value on its own and its display 211, possibly in several presentation formats 210 for different insurer groups may be needed, for example as a strong basis for the work of actuaries and underwriters to derive risk cost tables and guides, among multiple other groups who may be known to those skilled in the field. Once expert risk-cost data is determined, it may be input 211, system formatted and cleaned 210 and added to the system generated risk prediction data, along with contributions by other insurer employed groups to the data to be used 209 in predictive calculation of business desirability of insuring the new venture and premium recommendations 214, 218. Some factors that may be retrieved and employed by the system here are: to gather available market data for similar risk portfolios as pricing and insurer financial impact guidelines 213; all available data for all equipment and infrastructure to be insured may also be reanalyzed for accuracy, especially for replacement values which may fluctuate greatly and need to be adjusted intelligently to reflect that 212; the probabilities of multiple disaster payouts or cascading payouts between linked sites as well as other rare events or very rare events must be either predicted or explored and accounted for 217; an honest assessment of insurer company risk exposure tolerance as it is related to the possible customer's specific variables must be considered for intelligent predictive recommendations to be made 216; also potential payout capital sources for the new venture must be investigated be they traditional in nature or alternative such as, but not limited to insurance linked security funds 219; again, the possibility of expert opinion data should be available to the system during analysis and prediction of business desirability recommendations and premiums changed 218. All recommendations may be formatted 210 for specific groups within the insurer company and possibly portions for the perspective client and displayed for review 211.

While all descriptions above present use of the insurance decision platform for new clients, the majority of the above process is also applicable to such tasks as policy renewals or expansions.

Figure 3:
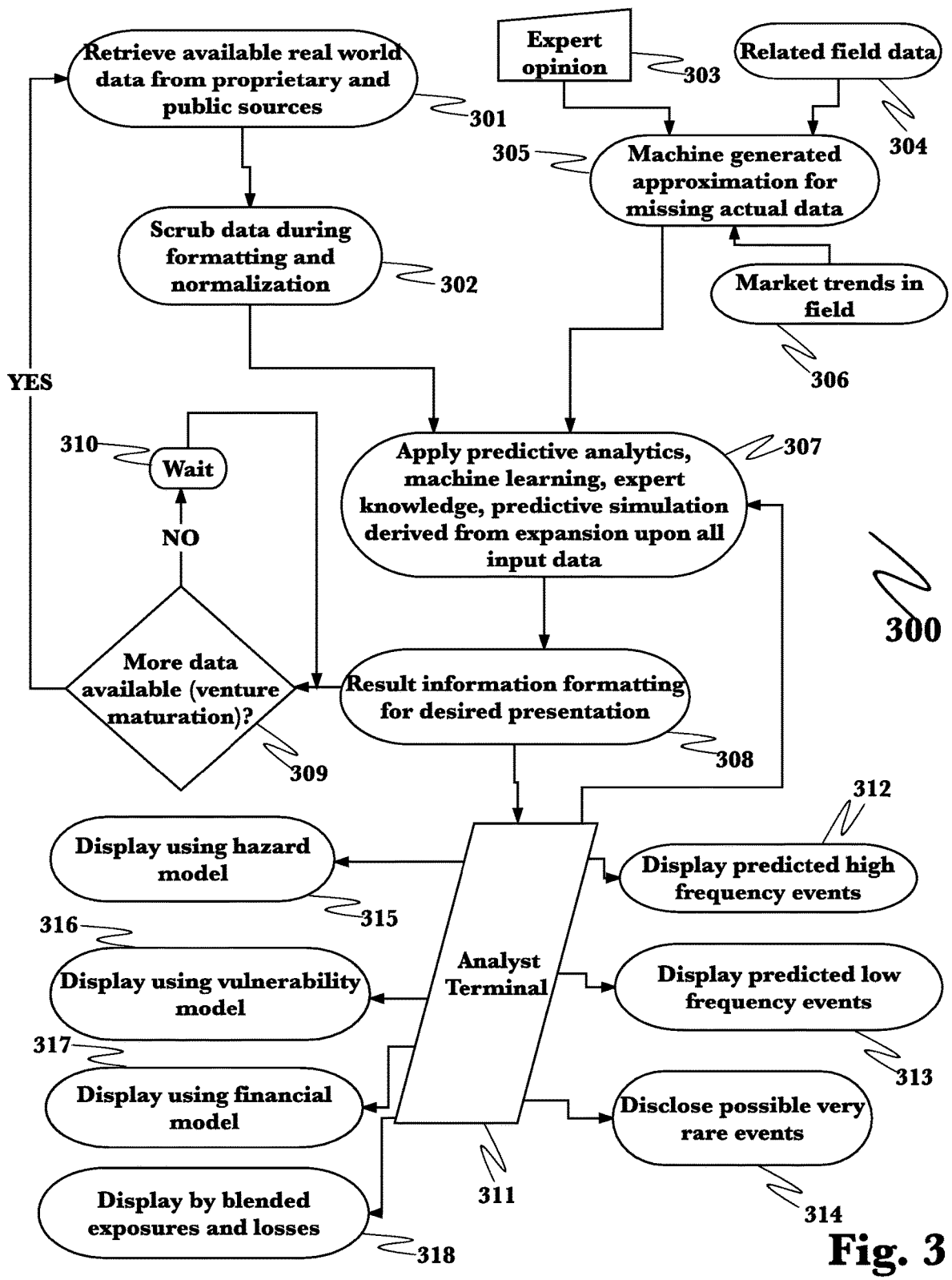
FIG. 3 is a process diagram showing business operating system functions in use to present comprehensive data and estimate driven predictive recommendations in emerging insurance markets using several possible presentation model formats.

FIG. 3 is a process diagram showing business operating system functions in use to present comprehensive data and estimate driven predictive recommendations in emerging insurance markets 300 using several possible presentation model formats. New insurance markets are continuously arising and the ability to profitably participate is of great importance. An embodiment of the invention 100 programmed analyze insurance related data and recommend insurance decisions may greatly assist in development of a profitable pathway in new insurance opportunities. Retrieval or input of any prospective new field related data from a plurality of both public and available private or proprietary sources acts to seed the process 301, specific modules of the system such as the connector module 135 with its programmable messaging service 135a, the High volume web crawler 115 and the directed computational graph module 155, among possible others act to scrub format and normalize data 302 from many sources for use. In new fields of possible insurance venture, many pieces of data necessary and useful for the arrival at reliable and informed decision are absent. Some of this can be circumvented by the presence of expert opinion from insurer's employees and outside consultants who may work in the field targeted by the venture 303 much of the rest of the information must be predictively synthesized using such sources as data available from insurance ventures in related fields 304, and market trends in the field 306 among other factors known to those skilled in the field and reliable approximations by the system based upon these factors 305. Actual data and estimates when combined may be further combined and predictively transformed by the insurance decision platform 307 to produce the most reliable model and recommendations possible to be considered by decision makers at the insurer such as actuaries, underwriters, financial officers and brokers to decide 308 on the best path forward without each of them having to have found and processed the data themselves which may have led to omissions and errors. Also, if the venture is pursued, the system may continuously monitor all resulting data such that the model 309, 310, 301 may be continuously improved and both insurer profitability and insurance coverage for the client are best optimized. Results may be formatted for display and manipulation in several different ways a few of which include a hazard model 315 which defines arbitrary characteristics of potential disasters or loss-initiating events and their frequency, location and severity using analytics or modeling simulation. In this display model, single-event characteristics are enhanced with event-set generation tools. A vulnerability model 316 which specify the response of insured assets and areas of interest based on the magnitude of experienced events. This display model blends expert opinion with empirical data and extracted models and can be re-configured to accommodate custom weightings. A financial model 317 which takes into account financial impact across all monitored assets and scenarios with each platform convolution while also considering portfolio-level losses and distributions. This model provides data optimized for making informed business decisions using an expected probability curve and promotes consideration of tools such as the tail value-at-risk to understand exposures to large single-event losses. Finally, a blended exposures and losses model 318 which operates under the knowledge that risks that may result in numerous losses concentrated in space and time are especially challenging. The strong correlation between inland flooding, storm surge and wind damage from hurricanes is a canonical example. This model optimizes the result data for display of multi-peril analysis to improve product development and introduction while balancing concerns related to correlated risk accumulation via modeling and named-peril risk transfer—even on all peril or multi-peril primary insurance products.

In addition to displaying the specifics of a new venture under the differential illumination of the above display models, asset peril may be visualized by predicted occurrence probabilities which range from "high frequency events" 312 which are usually of low and estimable severity per single event, low in peril risk, which is most easily calculated, has an estimable frequency when analytics are used and may follow a Gaussian type 1 distribution; to "low frequency events" 313 which may be of high severity per single event engenders a catastrophic event risk which is calculable and may be at least partially mitigatable, is difficult to estimate in frequency and thus may require both predictive analytic and simulation transformation to determine and follows a type 2 fat-tailed power law distribution; and last events that must be classified as "very rare" 314 which may be extremely severe if they occur possibly forecast by simulation, have an "existential" risk factor which is calculable only in terms of the impact of the event and may only be roughly estimable by input expert judgement, frequency cannot be forecast. Of course display of venture specific events of predicted as "high frequency" and "low frequency" are most likely whereas display of machine simulated "very rare" events are of value to spark further exploration and discussion.

Figure 4:
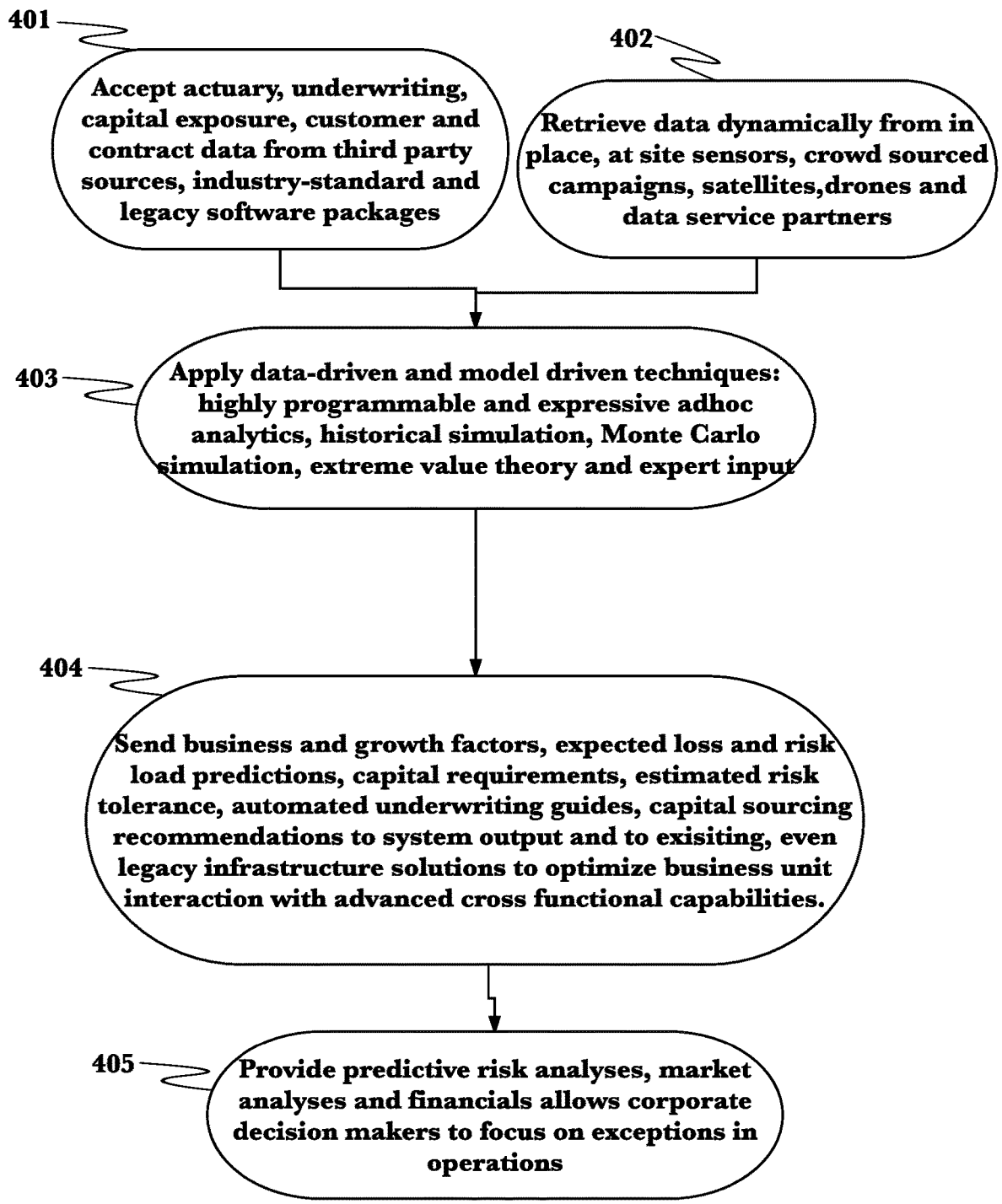
FIG. 4 is a process flow diagram of a possible role in a more generalized insurance workflow as per one embodiment of the invention.

FIG. 4 is a process flow diagram of a possible role in a more generalized insurance workflow 400 as per one embodiment of the invention. It is important that any added computational capability, such as the SaaS insurance decision platform, integrate with the majority, if not all of an insurer's existing workflow while opening the business to new sources of information and predictive capabilities. With its programmable connector module 135 and messaging center 135*a*, the insurance decision platform 100 is pre-designed to retrieve and transform data from the APIs of virtually all industry standard software packages and can be programmed to retrieve information from other legacy or obscure sources as needed, as an example, data may even be entered as csv and transformed, as a simplistic choice from the many possible formats known to one skilled in the art and for which the platform is capable to handle 401. Of greatly added value, the platform may allow the client insurer to receive data dynamically from in-place at site sensors at insurance client sites or in various areas of interest 402 due to the multidimensional time series 120 data store which can be programmed to interpret and correctly normalize many data streams 120*a*. Feeds from crowd sourced campaigns, satellites, drones, sources which may not have been available to the insurer client in the past can also be used as information sources as can a plurality of insurance related data, both on the general web and from data service providers may also add to the full complement of data the insurer client can use for decision making 402. To reliably and usefully process all of this data which can quickly overwhelm even a team dedicated to accumulation and cleansing, the platform may transform and analyze the data with model and data driven algorithms which include but are not limited to ad hoc analytics, historical simulation, Monte Carlo simulation, extreme value theory and processes augmented by insurance expert input 403 as well as other techniques known to be useful in these circumstances by those knowledgeable in the art, for which the platform is highly, expressively programmable. The output of system generated analyses and simulations such as estimated risk tolerances, underwriting guides, capital sourcing recommendations among many others known to those knowledgeable in the art may then be sent directly to dedicated displays or formatted by the connector module 135 and distributed to existing or existing legacy infrastructure solutions to optimize business unit interaction with new, advanced cross functional decision recommendations 404. The end result is that decision makers can focus on creative production and exception based event management rather than simplistic data collection, cleansing, and correlation tasks 405.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 5:
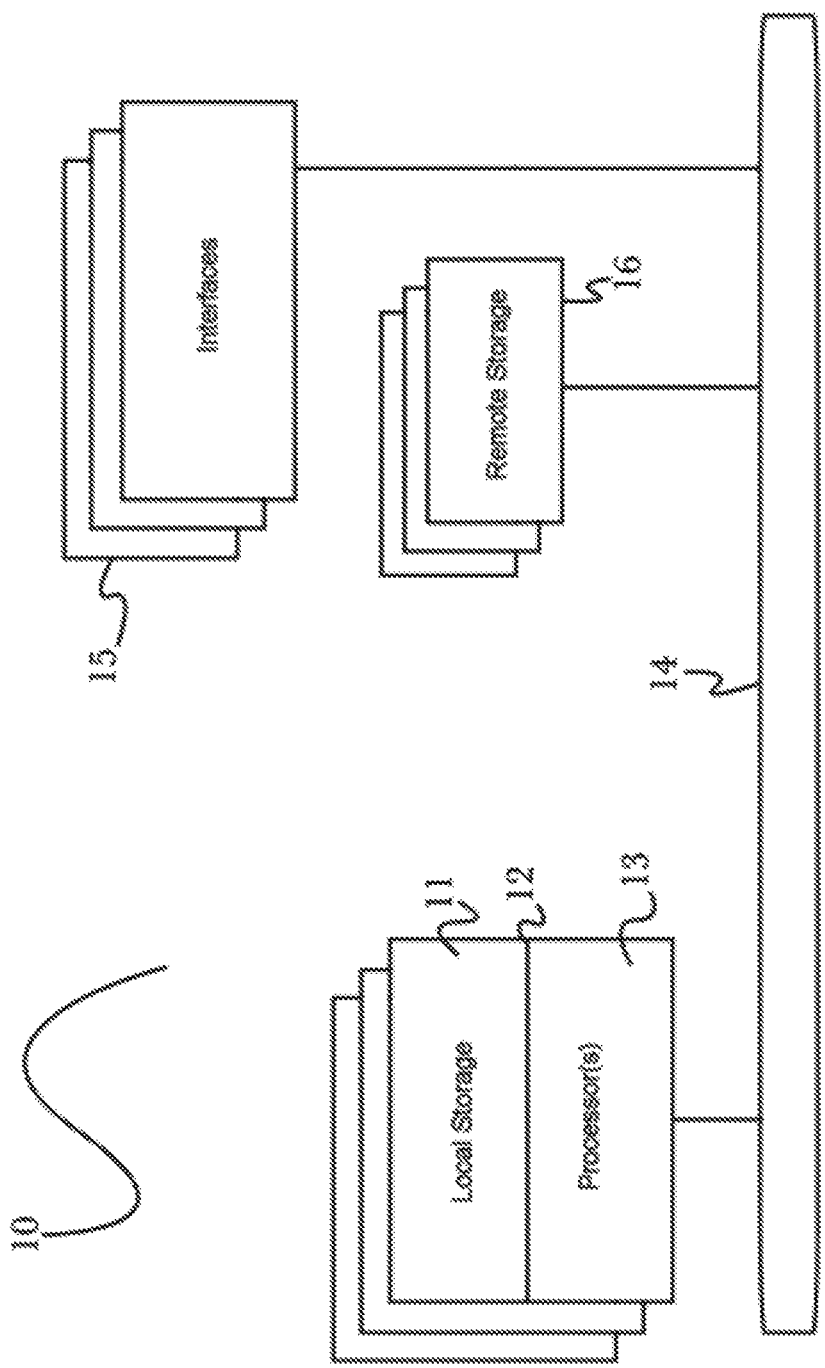
FIG. 5 is a block diagram illustrating an exemplary hardware architecture of a computing device used in various embodiments of the invention.

Referring now to FIG. 5, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 6:
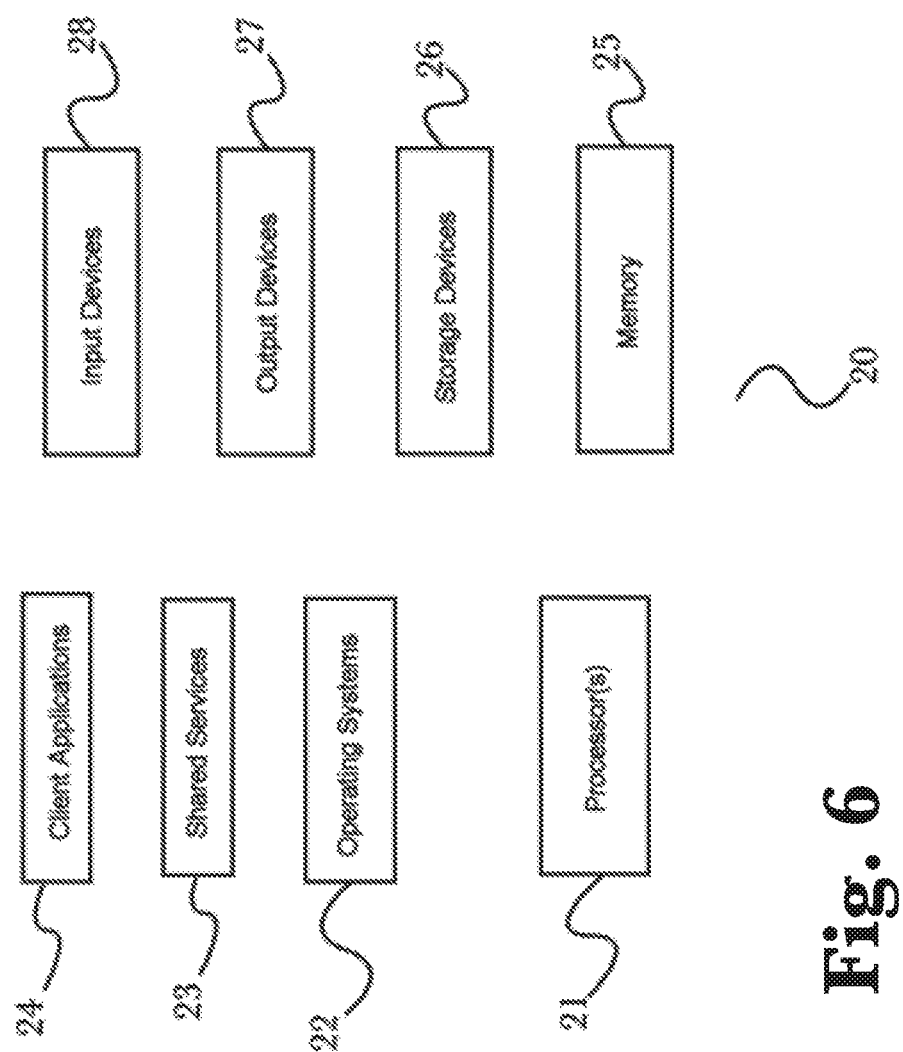
FIG. 6 is a block diagram illustrating an exemplary logical architecture for a client device, according to various embodiments of the invention.

In some embodiments, systems according to the present invention may be implemented on a standalone computing system. Referring now to FIG. 6, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 7:
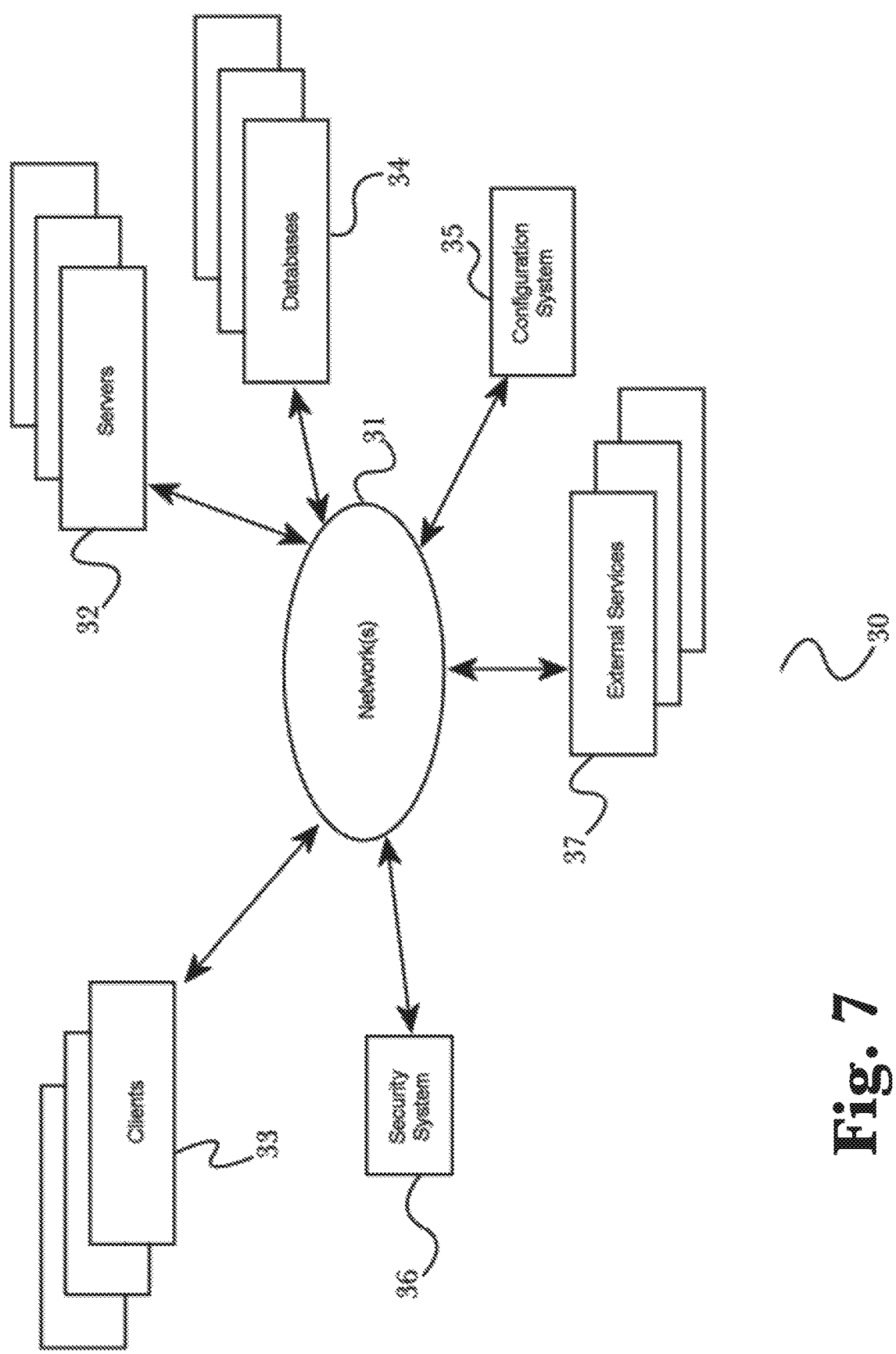
FIG. 7 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 7, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 8:
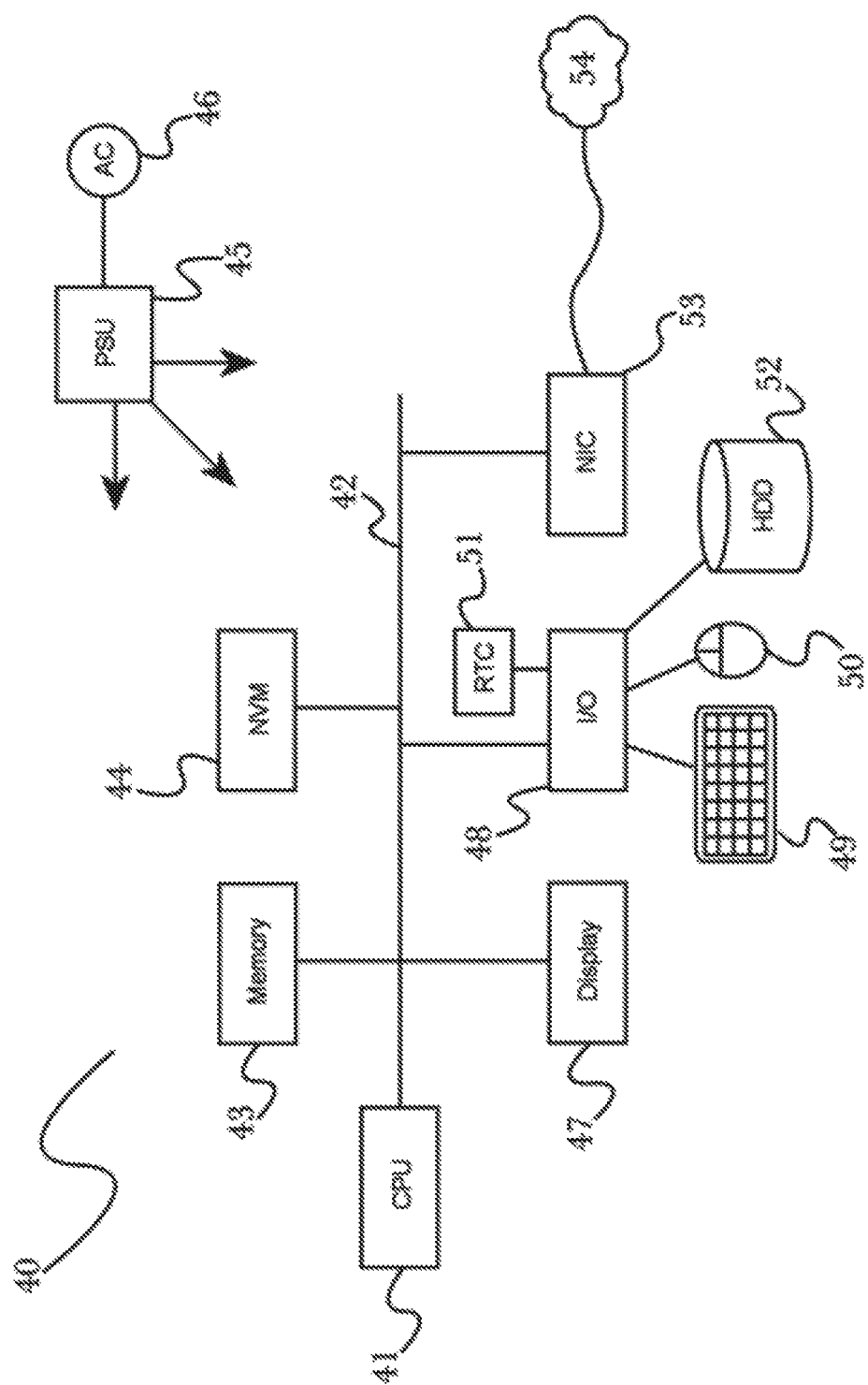
FIG. 8 is another block diagram illustrating an exemplary hardware architecture of a computing device used in various embodiments of the invention.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

The insurance decision platform described here is built upon highly programmable computer software architecture that may serve as the basis of a plurality of specific use systems. For example the architecture and base programming described here 100 being employed as an insurance decision platform 200 is the same computer architecture described in ¶032 and ¶033 of co-pending application Ser. No. 15/237,625 and specifically used as a cyber-attack detection mitigation and remediation platform in ¶035 through ¶037 of co-pending application Ser. No. 15/237, 625. The same base architecture and programming, presented here and previously and designed to be readily augmented by application specific data stores and programming may take on the capabilities or personalities of a plurality of highly advanced platforms in a plurality of fields both business and scientific where large volumes of data, at least a portion of which may enter the system in bursts or at irregular times is present and data which may need normalization and transformation as well as correlation of possibly hard to discern commonalities. The personality instilled platform may also be used in these fields to perform reliable analytics and run reliable simulations on the existing data to allow operators to intelligently determine next direction to implement (and which next direction potentially not to implement) potentially saving both time, money and resources. In summary, the business operating system disclosed here and in co-pending applications may be imagined more as a set of software engineered stations in a highly and readily modifiable virtual production line than as only a cyber-attack detection, mitigation and remediation system or as only an insurance decision platform as it is both and can be more.

In various embodiments, functionality for implementing systems or methods of the present invention may be distributed among any number of client and/or server components. For example, various software modules may be implemented for performing various functions in connection with the present invention, and such modules may be variously implemented to run on server and/or client.

The skilled person will be aware of a range of possible modifications of the various embodiments described above. Accordingly, the present invention is defined by the claims and their equivalents.

What is claimed is:

1. A system for risk quantification for insurance process management employing an advanced decision platform, comprising:
    a high speed data retrieval and storage module stored in a memory of and operating on a processor of a computing device and configured to:
        retrieve insurance contract underwriting terms pertaining to a physical asset;
        identify a plurality of risks associated with the physical asset based on the underwriting terms;
        search the Internet to identify a magnitude of each of the plurality of identified risks for the physical asset;
        search the Internet to identify an upcoming risk event in the geographical location of the physical asset;
    a predictive analytics module stored in a memory of and operating on a processor of a computing device and configured to:
        generate a vulnerability model that relates the insurance contract underwriting terms and the magnitude of the plurality of risks to determine a risk response of the physical assets to the plurality of risks;
        apply the upcoming risk event to the determined risk response to predict a loss associated with the physical asset;
    a predictive simulation module stored in a memory of and operating on a processor of a computing device and configured to:
        generate a blended exposures and losses model configured to analyze concentration of losses in terms of time and location;

generate synthetic data based on the magnitude of each of the plurality of risks and the predicted loss associated with the physical asset; and pass the synthetic data through the blended exposures and losses model to determine a concentrated risk of loss associated with a plurality of assets of the same type as the physical asset.

2. The system of claim 1, wherein the contract data further comprises information about a plurality of physical assets.

3. The system of claim 2, wherein the plurality of physical assets are owned by a business enterprise.

4. The system of claim 3, wherein the predictive simulation module further performs historical simulations based on actual loss data of the business enterprise.

5. The system of claim 3, wherein the vulnerability model further incorporates an environmental condition profile at one or more sites of the business enterprise.

6. The system of claim 3, wherein the vulnerability model further incorporates a geo-political condition at one or more sites of the business enterprise.

7. A method for risk quantification for insurance process management employing an advanced decision platform comprising the steps of:

retrieving insurance contract underwriting terms pertaining to a physical asset;

identifying a plurality of risks associated with the physical asset based on the underwriting terms;

searching the Internet to identify a magnitude of each of the plurality of identified risks for the physical asset;

searching the Internet to identify an upcoming risk event in the geographical location of the physical asset;

generating a vulnerability model that relates the insurance contract underwriting terms and the magnitude of the plurality of risks to determine a risk response of the physical assets to the plurality of risks;

applying the upcoming risk event to the determined risk response to predict a loss associated with the physical asset;

generating a blended exposures and losses model configured to analyze concentration of losses in terms of time and location;

generating synthetic data based on the magnitude of each of the plurality of risks and the predicted loss associated with the physical asset; and passing the synthetic data through the blended exposures and losses model to determine a concentrated risk of loss associated with a plurality of assets of the same type as the physical asset.

8. The method of claim 7, wherein the contract data further comprises information about a plurality of physical assets.

9. The method of claim 8, wherein the plurality of physical assets are owned by a business enterprise.

10. The method of claim 9, wherein the predictive simulation module further performs historical simulations based on actual loss data of the business enterprise.

11. The method of claim 9, wherein the vulnerability model further incorporates an environmental condition profile at one or more sites of the business enterprise.

12. The method of claim 9, wherein the vulnerability model further incorporates a geo-political condition at one or more sites of the business enterprise.

* * * * *